United States Patent
Nesta et al.

(10) Patent No.: US 7,770,032 B2
(45) Date of Patent: Aug. 3, 2010

(54) SECURE LOGGING FOR IRREFUTABLE ADMINISTRATION

(75) Inventors: Pasquale Andrea Nesta, Turin (IT); Luigi Nesta, legal representative, Turin (IT); Miranda Aurigemma, legal representative, Turin (IT); Giovanna Patrizia Nesta, legal representative, Turin (IT); Pier Luigi Zaccone, Turin (IT); Paolo Dal Checco, Turin (IT); Davide Cavagnino, Turin (IT); Francesco Bergadano, Turin (IT); Michele Miraglia, Rivoli (IT)

(73) Assignee: Telecom Italia S.p.A., Milan (IT)

( * ) Notice: Subject to any disclaimer, the term of this patent is extended or adjusted under 35 U.S.C. 154(b) by 691 days.

(21) Appl. No.: 11/547,711

(22) PCT Filed: Apr. 6, 2004

(86) PCT No.: PCT/EP2004/050460

§ 371 (c)(1),
(2), (4) Date: Jul. 11, 2007

(87) PCT Pub. No.: WO2005/098564

PCT Pub. Date: Oct. 20, 2005

(65) Prior Publication Data

US 2007/0288768 A1    Dec. 13, 2007

(51) Int. Cl.
    *G06F 21/00*    (2006.01)
(52) U.S. Cl. .................................... 713/194; 726/26

(58) Field of Classification Search ................. 380/284; 713/157, 194; 726/26–30
See application file for complete search history.

(56) References Cited

U.S. PATENT DOCUMENTS

| 5,978,475 | A | 11/1999 | Schneier et al. |
| 6,385,596 | B1 * | 5/2002 | Wiser et al. .................. 705/51 |
| 6,393,564 | B1 * | 5/2002 | Kanemitsu et al. ......... 713/168 |
| 6,725,240 | B1 * | 4/2004 | Asad et al. ................. 707/202 |

(Continued)

FOREIGN PATENT DOCUMENTS

EP    1 320 017 A2    6/2003

OTHER PUBLICATIONS

Ruffin, "A Survey of Logging Uses", Broadcast Technical Report 36, Esprit Basic Research Project 6360, pp. i-iii and 1-26, (Feb. 21, 1995).

(Continued)

*Primary Examiner*—Gilberto Barron, Jr.
*Assistant Examiner*—Shaun Gregory
(74) *Attorney, Agent, or Firm*—Finnegan, Henderson, Farabow, Garrett & Dunner, L.L.P.

(57) ABSTRACT

A method for protecting sensitive data in an entry of a log file for later audit, which includes encrypting the sensitive data in the log entry by using a random cryptographic key for each auditor authorized to access the log entry, encrypting the random cryptographic key by using an auditor's personal cryptographic key, and for each auditor not authorized to access the log entry, encrypting a fake cryptographic key having the same properties as the random cryptographic key by using an auditor's personal cryptographic key.

34 Claims, 2 Drawing Sheets

U.S. PATENT DOCUMENTS

| | | | |
|---|---|---|---|
| 2002/0067832 A1* | 6/2002 | Jablon | 380/277 |
| 2003/0212899 A1 | 11/2003 | Curtis | |
| 2003/0217281 A1 | 11/2003 | Ryan | |
| 2003/0236992 A1* | 12/2003 | Yami | 713/200 |
| 2004/0064729 A1* | 4/2004 | Yellepeddy | 713/201 |
| 2004/0123116 A1* | 6/2004 | Jin et al. | 713/187 |

OTHER PUBLICATIONS

National Institute of Standards and Technology, NIST FIPS PUB 180-1, "Secure Hash Standard", U.S. Department of Commerce, pp. i-iii and 1-21, (Apr. 17, 1995).

National Institute of Standards and Technologies, NIST FIPS PUB 197, "Advanced Encryption Standard (AES)", U.S. Department of Commerce, pp. i-iv and 1-47, (Nov. 26, 2001).

Rivest, et al., "A Method for Obtaining Digital Signatures and Public-Key Cryptosystems", Communications of the ACM, vol. 21, No. 2, pp. 120-126, (Feb. 1978).

National Institute of Standards and Technologies, NIST FIPS PUB 186, "Digital Signature Standard", U.S. Department of Commerce, 18 pages, (May 1994).

Menezes, et al., "Handbook of Applied Cryptography", CRC Press, pp. 524-528, (1996).

Shamir, "How to Share a Secret", Communications of the ACM, vol. 22, No. 11, pp. 612-613, (1979).

Borgman, "Privacy and Data Protection Issues for UCLA" 'Online!, XP002310241, retrieved from the Internet: http://web.archive.org/web/20041210084350/http://www.itpb.ucla.edu/documents/2003/September192003retreat/3.3.2Privacv&DataProtectionIssuesforUCLAJune102003.pef, pp. 1-17, (Nov. 12, 2003).

Spitzner, "Honeypots—Definitions and Value of Honeypots", XP-002309684, retrieved from the Internet: http://www.tracking-hackers.com/papers/honeypots.html, pp. 1-4, (May 29, 2003).

Schneier, "Basic Protocols", and "Key Management", Chapters 3 and 8, John Wiley & Sons, Applied Cryptography, Protocols, Algorithms, and Source Code in C, XP-002973152, pp. 47-74, 169-187, (1996).

UCLA: 'Online! XP-002310238, retrieved from the Internet: http://web.archive.org/web/20031112171755/http://www.itpb.ucla.edu/documents, pp. 1-2, (Nov. 12, 2003).

* cited by examiner

SECURE LOGGING FOR IRREFUTABLE ADMINISTRATION

CROSS REFERENCE TO RELATED APPLICATION

This application is a national phase application based on PCT/EP2004/050460, filed Apr. 6, 2004.

TECHNICAL FIELD OF THE INVENTION

The present invention relates in general to data processing, and in particular to secure logging of data in a file for irrefutable administration.

In particular, the present invention finds an advantageous, but not exclusive, application in contexts involving system and network administrators and administered systems and networks, to which the following description will refer without this implying any loss of generality.

BACKGROUND ART

As is known, there are contexts where a need exits to check and verify operations performed by an entity, e.g. an administrator, on another entity, e.g., a computer system. For example, in industry outsourcing is an adopted practice and therefore a need exits to control the operations performed by the personnel of the external company to which the job is farmed out and at the same time to guarantee the privacy of the personnel, without however giving up the possibility of verifying and linking, in case of necessity, the operations with the people who performed them.

In a context involving system and network administrators and administered systems and networks, the aforementioned need is generally met by generating a so-called "log file", which M. Ruffin, *A survey of logging uses*, Tech. Rep., Dept. of Computer Science, University of Glasgow, Glasgow, Scotland, February 1995. defines as a "plain file where data are stored sequentially as they arrive, by appending them to the end of the file. When a problem arises in the system (e.g. a fault or an intrusion), the log file is re-read to find its source and/or to correct its consequences".

In many computer applications, sensitive information such as log files must be kept on an untrusted machine. Such information must be protected against attackers, as well as against partially trusted entities to be given partial, but not total, access to the stored information.

US 2003/0212899 discloses a method, an apparatus, and computer instructions for protecting sensitive data in a log file. Data is logged into a file. The data in the log file is in a protected state and the data is never written to the log file in an unprotected fashion. Prior to the data being logged into the file, the data is parsed for specific data meeting predetermined criteria. The specific data is selectively protected with a security measure while leaving a remainder of the log file unprotected by the security measure. The viewer or program used to access the data in the log file is responsible for unprotecting or allowing the data to be viewed if the appropriate key is provided.

Furthermore, U.S. Pat. No. 5,978,475 provides a method and an apparatus for generating a secure audit log using an untrusted machine communicating with a trusted machine over a limited communications channel. Entries are stored in the audit log in sequential order. Each entry in the audit log contains the one-way hash of the previous entry. This enables an auditor to verify that each entry was written into the log after the previous entry and before the subsequent entry. Any attempt to delete entries, add entries, or modify entries in the middle of the log will be immediately noticed because the one-way hash function values will no longer be valid.

Each log entry contains a permission mask, an encrypted file, a (unkeyed) hash value including the encrypted file plus a representation of a previous hash value, and a (keyed) message authentication code (MAC) value that itself authenticates the hash value. The MAC is cryptographically secured with an authentication key derived by hashing an authentication key for a previous log entry; and the (encrypted file is cryptographically secured with an encryption key derived by hashing the authentication key. This makes it possible to give encryption keys for individual log entries to partially-trusted entities, allowing them to read and decrypt files without being able to make undetectable changes. In addition, because both the authentication and encryption keys are session-specific and irreversibly related to their predecessor values (i.e., a current key can be generated from its predecessor, but not vice-versa), an attack on a single entry can not be extended backward through the sequence to change the entire audit trail. This both prevents undetectable attack on a single entry and preserves the security of its predecessors.

OBJECT AND SUMMARY OF THE INVENTION

The aim of the present invention is to provide a secure and reliable method for logging all the operations that occur in a complex environment for a subsequent control, linking these operations to the entities involved (namely, the system administrator and the system itself), and implementing privacy policies and security and anti-tampering functionalities.

In particular, the aim of the present invention is to implement such policies and functionalities in such a way that:
the log file does not immediately disclose its content;
the log file cannot be modified without detection, i.e., if the log file is modified, this modification can be discovered a posteriori by the auditors that will check its content;
the log entries can be decrypted and examined only by entities that have the rights to perform this operation; and,
the log entries are not directly associated to the entities that are involved in the activities described in the log entries themselves.

This aim is achieved in accordance with the present invention, by a method for protecting sensitive information (A, ΣA, D, ΣD) for later audit by a plurality of auditors, said sensitive information including items of sensitive information, comprising:
for each auditor of said plurality authorized to access a specific item of sensitive information (D, ΣD, A, ΣA), encrypting at least said specific item of sensitive information (D, ΣD, A, ΣA) by using an auditor's cryptographic key (K, K$^+$), characterized by:
for each auditor of said plurality not authorized to access said specific item of sensitive information (D, ΣD, A, ΣA), generating a first item of fake information (E(K/H (D)), E(K/H(ΣD)), E(K/H(A)), E(K/H(ΣA))) having the same properties as the encrypted specific item of sensitive information (E(K/D), E(K/ΣD), E(K/A), E(K/ΣA)).

In accordance with the present invention, there is also provided a processing system programmed to implement the method according to the present invention; a network of computers including, on at least one of said computers, storage for information relating to access to a plurality of entities, said network including a processing system to implement the method of the present invention wherein said specific items of sensitive information include said information relating to access to at least any of said plurality of entities; and a computer program product comprising a computer program code capable, when loaded in a processing system, of implementing the method according to the present invention.

Specifically, the need to keep the content of a log file unalterable (without detection) can be met by means of signatures and an hash chain that links all the log entries together, whereas the need to keep the content of a log file private is met by means of encryption. Each log entry is encrypted with a key that is successively encrypted with the keys of the entities that have the right to access the log entry. Moreover, the encrypted key may be distributed among a set of entities, if these entities have access to the log entry only together. The solution proposed also guarantees the privacy in the access to a log entry: this is obtained with an exclusion/ elusion property according to which data to be used to access a log entry is encrypted in a way that it is impossible, if not in possession of the decrypting key, to decide if the data is useful or not for disclosing the content of the log entry. The consequence of this is that no one is able to decide whether an auditor has access or not to a log entry (except the auditor itself).

This is efficient in the sense that it uses only one key to encrypt a log entry, and distributes this key among the auditors with the modes previously discussed. Nonetheless, this key changes for each log entry, leaving a fine granularity in giving or not the possibility to various auditors to access the content of a log entry.

BRIEF DESCRIPTION OF THE DRAWINGS

For a better understanding of the present invention, a preferred embodiment, which is intended purely by way of example and is not to be construed as limiting, will now be described with reference to the attached drawings, wherein.

DETAILED DESCRIPTION OF PREFERRED EMBODIMENTS OF THE INVENTION

The following discussion is presented to enable a person skilled in the art to make and use the invention. Various modifications to the embodiments will be readily apparent to those skilled in the art, and the general principles herein may be applied to other embodiments and applications without departing from the spirit and scope of the present invention. Thus, the present invention is not intended to be limited to the embodiments shown, but is to be accorded the widest scope consistent with the principles and features disclosed herein and defined in the attached claims.

Furthermore, the following discussion will refer to an environment in which administrators perform various activities on objects and these activities are logged in a file formed by a set of entries each referring to a particular event of interest in each activity.

Figure 1:
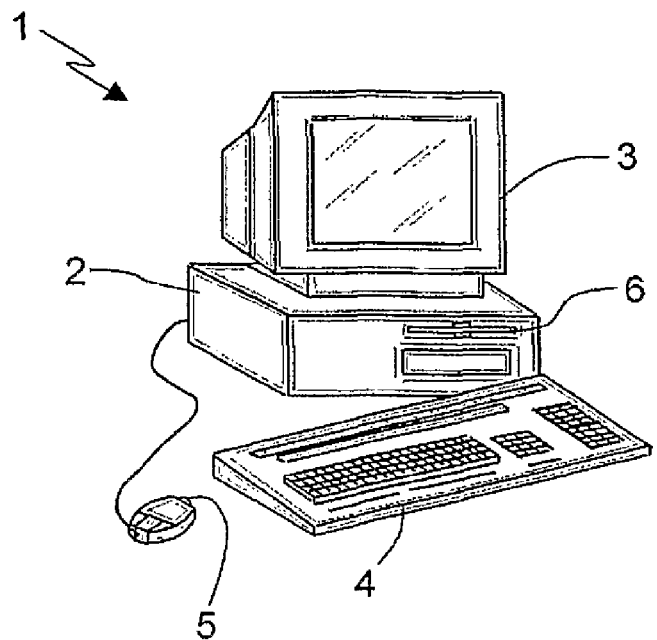
FIG. 1 shows an untrusted computer where the present invention may be implemented.

FIG. 1 shows a computer system 1 in which the present invention may be implemented and including a processing system 2 with a central processing unit (CPU), a video monitor 3, a keyboard 4, a mouse 5, storage devices 6 including floppy drives and other types of permanent and removable storage media, such as RAM, ROM and hard disk drives.

Figure 2:
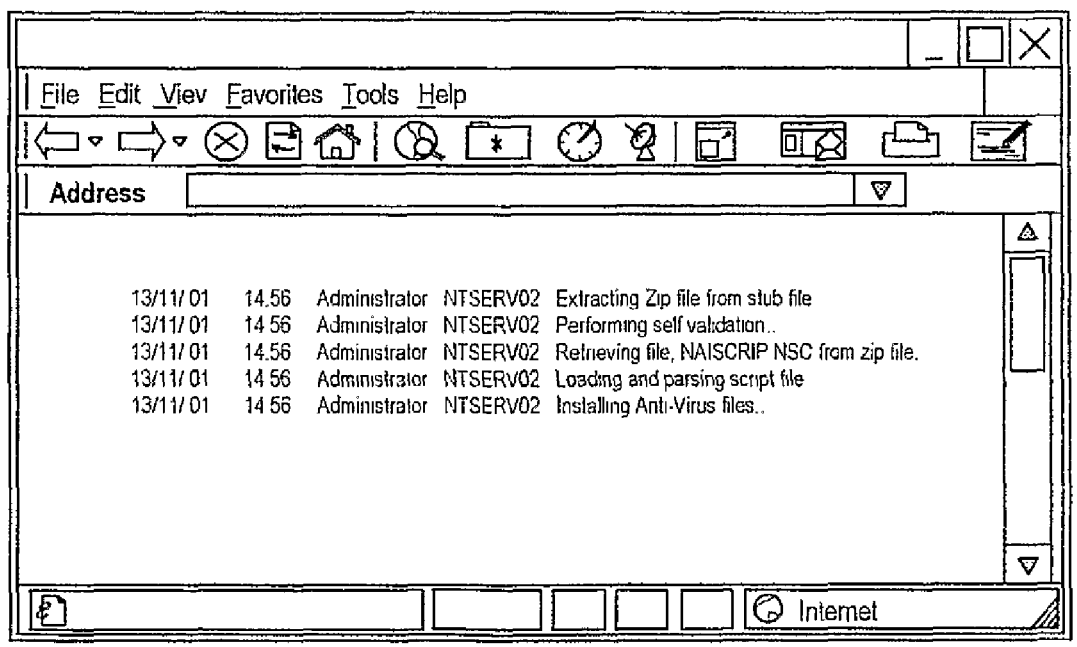
FIG. 2 shows a log window displaying some entries in a log file.

FIG. 2 shows a log window displaying some entries in a log file. As shown in FIG. 2, each log entry is formed by two parts: an identification section that univocally identifies the entry and contains general information useful for retrieving and identifying the data, namely time stamps, administered entity and administrator, and a data section that contain the logged data which, in this case, represent the operations performed by a given administrator.

Figure 3:
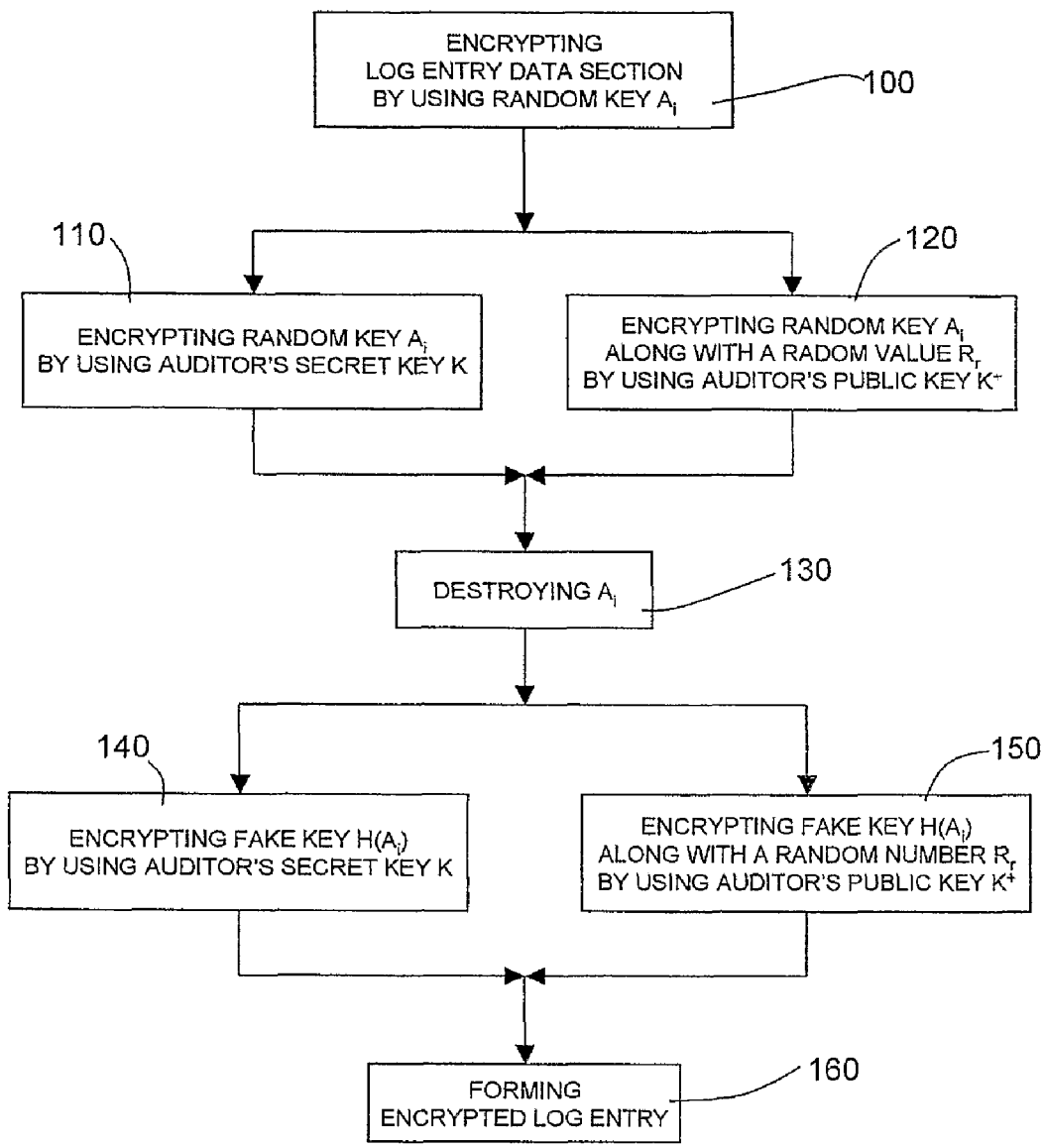
FIG. 3 shows a flow chart illustrating the operations carried out to encrypt a log entry according to the present invention.

FIG. 3 shows a flow chart illustrating the operations carried out to encrypt a log entry according to the present invention.

In particular, in order to allow each log entry to be accessed by a single auditor or by a group of auditors separately one from another, data section in the log entry is encrypted by using a random key $A_i$ which has a known fixed length, is different for each log entry, is generated automatically and randomly, and may be accessed by auditor(s) on the basis of privileges which define an exclusion/elusion property that will be discussed in detail later on (block 100). Then, for each auditor that is authorized to access the log entry, the random key $A_i$ is encrypted and stored for later use in auditing. In particular, encryption of the random key $A_i$ for each authorized auditor may be carried out in two different ways:

a) each authorized auditor has his own symmetric secret key and the random key $A_i$ is encrypted for each authorized auditor by using this symmetric secret key (block 110);

b) each authorized auditor has his own pair of asymmetric public/private keys and the random key $A_i$ is encrypted for each authorized auditor along with a known length random number $R_r$ different for each authorized auditor by using the auditor's asymmetric public key (block 120). Preferably, before encryption, random key $A_i$ and random number $R_r$ are concatenated by arranging one after the other. The auditor will then use his private key to decrypt the encrypted aforementioned concatenation and to read out the known fixed length random key $A_i$ so as to access the data section of the log entry. The need to combine the random key $A_i$ with a random number $R_r$ different for each authorized auditor derives from the need to preserve an elusion property which will be discussed later on.

After encryption, the random key $A_i$ is destroyed so that only the authorized auditor(s) will be able to reconstruct the original log entry (block 130).

Furthermore, in order to achieve the exclusion/elusion property, the following approach is implemented which varies by using approach a) or b).

In particular:

c) in case approach a) has been implemented to encrypt the random key $A_i$ for the authorized auditors, a fake key having the same properties as the random key $A_i$ in terms of length, uniqueness and randomness is generated for the log entry and then encrypted for each auditor that is not authorized to access the log entry by using the auditor's symmetric secret key (block 140). The fake key for the log entry is obtained by computing $H(A_i)$, i.e., a non-invertible function such as a one-way hash function of the random key $A_i$. In the literature many one-way hash functions easy to compute have been proposed (for example a one-way hash function is the one known as SHA-1 (Secure Hash Algorithm, Revision 1) and described in National Institute of Standards and Technology, NIST FIPS PUB 180-1, *Secure Hash Standard*, U.S. Department of Commerce, April 1995).

Thanks to the property of the hash function, the fake key $H(A_i)$ has the same properties as the random key $A_i$ in terms of length, uniqueness and randomness and moreover given $H(A_i)$, it is not feasible to compute $A_i$. The one-way hash function is an efficient source of randomness and is to be intended purely by way of example and not construed as limiting. In fact, a random key $B_i$, (which can be generated, for example, by a true hardware based random number generator or a pseudorandom generator passing FIPS 140-2 test suite) different from the random key $A_i$, could also be directly generated and used as a fake key in place of $H(A_i)$.

d) in case approach b) has been implemented to encrypt the random key $A_i$ for the authorized auditors, a fake key having the same properties as the random key $A_i$ in terms of length, uniqueness and randomness is generated for the log entry and then encrypted for each auditor that is not authorized to access the log entry, along with a known length random number $R_r$, different for each non-authorized auditor, by using the auditor's asymmetric public key (block 150). Similarly to approach c), the fake key for the log entry can be obtained by computing $H(A_i)$, but a random key $B_i$ different from the random key $A_i$ could also be directly generated in place of $H(A_i)$. The need to combine the fake key $H(A_i)$ with a random number $R_r$, different for each non-authorized auditor, derives from the need to preserve an elusion property which will be discussed hereinafter.

Then, an encrypted log entry is formed including the encrypted data section, the encrypted random keys $A_i$ for the authorized auditors, the encrypted fake keys (e.g. $H(A_i)$) for the non-authorized auditors, and further data, as described in more detail later on (block 160).

The preceding approach allows simultaneous achievement of the following two security properties:

Exclusion: it is easy to exclude one or more auditors from accessing the encrypted data section of the log entry by simply providing them with the fake key. Advantageously, by using different random keys $A_i$ for different log entries allows achievement of a fine granularity in giving access to each log entry. Thus the exclusion can be local to each log entry.

Elusion: it may be appreciated that by simply looking at the encrypted log file it is not possible to understand which auditors have access to which log entries. This is due to the fact that a random key $(A_i, H(A_i))$ is encrypted for each auditor. In this connection, a fine distinction between the two previously described approaches a) and b) can be made:

approach a): access to an encrypted log entry depends on the possession of the random key $A_i$, that is necessary to decrypt the encrypted log entry, or the fake key $H(A_i)$, that does not allow access to the encrypted log entry. However, as a good symmetric key encryption algorithm (e.g. AES) is supposed to make computationally unfeasible to understand if a certain encrypted text has been obtained from a specified clear text, (see also http://csrc.nist.gov/CryptoToolkit/aes/pre-round1/aes_9709.htm section 4 as available on the Internet on 5 Apr., 2004, subsection SECURITY) it is unfeasible that a person who does not know the symmetric secret key for an auditor can deduce which key (whether $A_i$ or $H(A_i)$) has been encrypted for that auditor. It may be appreciated that it is important that the fake key $H(A_i)$ changes for each log entry. In fact, if a constant value for the auditors that do not have access to a log entry is used, then encrypting a constant value by using a fixed key (the secret key of the non-authorized auditor) will disclose the log entries that are not accessible to an auditor by simply inspecting the log file and looking for a repeated value for an auditor;

approach b): because an asymmetric cryptosystem assume that secrecy of the public key is not a requirement it is possible to deduce which auditor is able to decrypt the encrypted random key $A_i$. Simply encrypting $A_i$ with the possible auditor's public and checking which result matches the encrypted random key $A_i$ retrieved from the log entry. In order to prevent such a disclosure of information, the use of random values $R_r$ ensures the elusion property. In particular, for those auditors having the right to access the encrypted log entry, then the random key $A_i$ is encrypted along with a random number $R_r$, which is different for each auditor in order to ensure that an auditor decrypting the encrypted random key $A_i$ is not able, through asymmetric encryption using the other's auditors public key, to deduce which of them has access to the log entry. In fact, without the random value, an auditor that knows $A_i$ could try to encrypt $A_i$ by using the known public keys of all the other auditors and then identify those auditors who have an autonomous access and those who don't. At the same time, for those auditors who do not have access to a log entry, a random value (also in this case, different for each auditor) is encrypted along with the fake key by using the public key of each auditor, thus the resulting value is undistinguishable from the encryption of the random key $A_i$ and a random value.

Here below are the structures of an encrypted log entry in the two previous approaches a) and b), where i indexes the log entries, k indexes the entities involved in the logged activity, and j indexes the various auditors:

$$L_i = \{TS_i, U_k, \ell_i, SE(A_i/D_i), SE(K_1/A_i), \ldots, SE(K_{j-1}/A_i), SE(K_j/H(A_i)), \ldots, SE(K_n/H(A_i)), HC_i, S_i\} \quad \text{a)}$$

$$L_i = \{TS_i, U_k, \ell_i, SE(A_i/D_i), AE(K^+_1/(A_i, R_1)), \ldots, AE(K^+_{j-1}/(A_i, R_{j-1})), AE(K^+_j/H(A_i), R_j), \ldots, AE(K^+_{j-1}/(H(A_i), R_n)) HC_i, S_i\} \quad \text{b)}$$

where:

$TS_i$ is the timestamp assigned to the entry. It may express the time of logging or the time of the reception. Even if the data contained in the log entry already contains a timestamp, $TS_i$ may be useful for some cross checks on the data;

$U_k$ is an identifier of the log entry. It contains all the information necessary to identify the activity and the entities involved (administrator and administered system);

$\ell_i$ is the length of data in cryptographic blocks;

$D_i$ are the logged data in the i-th log entry;

$A_i$ is the random key used to encrypt the data in the i-th log entry;

$K_1, \ldots K_n$ are the auditors' symmetric secret keys used in approach a) to encrypt random key $A_i$;

$K^+_1 \ldots K^+_n$ are the auditors' asymmetric public keys used in approach b) to encrypt random key $A_i$;

$R_1, \ldots R_n$ are the random values used in approach b) to preserve the elusion property.

$SE(x/y)$ is a symmetric encryption function that uses the symmetric key x to encrypt data y and returns the encrypted data. This symmetric encryption function may be the one known as AES and described in National Institute of Standards and Technologies, NIST FIPS PUB 197, *Advanced Encryption Standard (AES)*, U.S. Department of Commerce, November 2001;

$AE(x^+/y)$ is an asymmetric encryption function that uses the asymmetric key $x^+$ to encrypt data y and returns the encrypted data. This asymmetric encryption function may be the one known as RSA and described in R. Rivest, A. Shamir, and L. Adleman, *A Method for Obtaining Digital Signatures and Public-Key Cryptosystems*, Communications of the ACM, 21 (1978), pp. 120-126;

H(x) is the one-way hash function, for example the one known as SHA-1.

$HC_i$ is the link of the hash chain for the i-th log entry;

$S_i$ is the signature of the link of the hash chain, i.e., it corresponds to Sign ($B^-/HC_i$), that is the function of digital signing $HC_i$ with the logging system private key ($B^-$); it outputs the signature. Functions that may be used are, for example, the above-mentioned RSA or the one known as DSA and described in National Institute of Standards and Technologies, NIST FIPS PUB 186, *Digital Signature Standard*, U.S. Department of Commerce, May 1994.

In the previous two examples a) and b) $SE(A_i/D_i)$ represents the encryption of the data $D_i$ logged in the i-th log line carried out by using the random key $A_i$ in order to allow the access to the encrypted data only to the authorized auditors, whereas $SE(K_j/H(A_i))$ represents the encryption of the fake key $H(A_i)$ carried out by using the j-th auditor's symmetric secret key $K_j$, and $AE(K^+_j/(A_i,R_j))$ represents the encryption of the random key $A_i$ concatenated with the random value $R_j$ carried out by using the j-th auditor's public key $K^+_j$.

It may therefore be appreciated that in previous two examples, auditors from 0 to j−1 have access to the log line content, whereas auditors from j to n have not.

The element (link) $HC_i$ of the hash chain is the hash of the previous log entry hash (i.e. $HC_{i-1}$) concatenated with all the elements of the current entry, except $HC_i$ and $S_i$ (because the first one is what we are computing, and the second one will depend on the first one). The element $HC_i$ of the hash chain is computed by using the following formulas (for both the above-described approaches a) and b)):

$$HC_i = H(HC_{i-1}, TS_i, U_i, t_i, SE(A_i/D_i), SE(K_1/A_i), \ldots, SE(K_{j-1}/A_i), SE(K_j/H(A_i)), \ldots, SE(K_n/H(A_i))) \quad \text{a)}$$

$$HC_i = H(HC_{i-1}, TS_i, U_i, t_i, SE(A_i/D_i), AE(K^+_1/(A_i,R_1)), \ldots, AE(K^+_{j-1}/(A_i,R_{j-1})), AE(K^+_j/H(A_i), R_j), \ldots, AE(K^+_n/H(A_i), R_n)) \quad \text{b)}$$

The first element of the hash chain, namely $HC_1$, is computed using as previous element a fixed and known value for $HC_0$ which may be recorded, without encryption, in the beginning of the log file. When a line is verified, the hash of the previous line is trusted, thus a verification of the signature of the previous line is performed.

In addition to linking log entries, hash chain with signed elements makes it possible to control the integrity of the chain even if the log file is stored (also partly) in different removable memory devices, on condition that the first element of the chain be authentic.

Each element of the hash chain is singularly signed by using the logging system private key $B^-$ because anyone could compute an hash without knowing any secret and therefore anyone could modify, delete or invert log entries without possibility of detection: it may in fact be possible to a malicious user to re-compute the elements of the hash chain subsequent to the one in the maliciously modified log entry.

To detect a possible corruption of the log file, it is not enough to verify authenticity of the last chain element only, but it is necessary to verify authenticity of all the chain elements, i.e., it is necessary to re-compute the whole hash chain, compare it with the existing one and verify authenticity of every single signature for every single chain element. In fact, in case a malicious user modifies the last log entry and update the corresponding chain element, such a user does not know the logging system private key $B^-$ and therefore cannot sign the modified chain element. During verification of all the chain elements, including those ones generated after log file corruption, the chain elements would however prove to be linked as expected and the signature of the last chain element would prove to be authentic.

As an alternative to the above-described asymmetric signature function, a function allowing computation of a MAC (Message Authentication Code) could be used, which is a function that uses a secret altogether similar to a symmetric key to generate an authentic digest. By even using MAC functions based on hash, i.e., HMAC functions, it is also possible to compute an HMAC chain which is intrinsically and automatically authentic.

Heretofore there have been discussed the so-called "single auditing", i.e., the possibility of enabling an auditor to access a log entry, and the so-called "separate auditing", i.e., the possibility of enabling a group of auditors to access a log entry separately one from another.

Hereinafter there will be discussed the so-called "group auditing", i.e., the possibility of enabling a group of auditors to access a log entry only when at least any n authorized auditors over N in the group agree on looking at its content.

This functionality is based on what in literature is known as "secret sharing".

For example, G. R. Blakley, *Safeguarding cryptographic keys*, Proc. of AFIPS, 1979 NCC, Vol. 48, Arlington, Va., June 1979, pp. 313-317 proposes a model for sharing a secret based on n-dimensional geometry and in particular develops a method to keep copies of cryptographic keys by distributing the secret among many people. An example of this method may also be found in A. J. Menezes, P. C. van Oorschot and S. A. Vanstone, *Handbook of Applied Cryptography*, CRC Press, 1996, pags 524 to 528 which discloses distributing a secret among m parts, where at least three of them are required to reconstruct the secret. In this paper, the secret is represented as a point into the three dimensional space and m planes are constructed such that any three of them intersect into the point representing the secret, but any two of them define a line. Only knowing at least three of these planes, it is possible to unambiguously identify the single point in space.

Another proposal may be found in A. Shamir, *How to share a secret*, Communications of the ACM, 22 (1979), pp. 612-613, which discloses a method for distributing a secret among n entities where at least k of them are necessary to reconstruct the original secret. It is based on polynomial interpolation. The idea is to construct a polynomial q(x) of degree k−1 having random coefficients, except for the coefficient of $x_0$, that is equal to the secret to share. Distributing the evaluation of the polynomial into n different points, then it is possible to calculate the k coefficients (thus the shared secret also) only when at least k evaluations of the polynomial are available. This can be done by interpolating the polynomial in the k points (note that there is only one polynomial of degree k−1 that fits into k points, and there are infinite polynomials of the same degree that fit into k−1 points).

The group auditing of the present invention can be based on the method disclosed in the latter paper and aims at achieving the following functionalities:

each auditor can access the content of a log line either alone (if he has the rights) or with the cooperation of other auditors (if he belongs to a group of auditors that can have access to the line);

when a group of auditors has used a secret to disclose the content of a line, then this secret is useless if used to disclose the content of other lines; the reason is that when a group of auditors agree on looking at the content of a line, then some of them may not agree on disclosing the content of other lines to the members of the same group;

each auditor may belong to any number of groups or to none.

To achieve the aforementioned functionalities, a share to determine the random key $A_i$ is distributed among the auditors that need a group access to a log line. That is, in block 110, instead of encrypting the random key $A_i$, data that allows the reconstruction of the complete random key $A_i$ when combined with complementary data owned by other authorized auditors is encrypted for each authorized auditor.

This implies that to decrypt a log entry there may be:
auditors that have access to the log entry as stand alone entities, i.e. they have $SE(K_j/A_i)$ or $AE(K^+_j/(A_i,R_j))$;
auditors that do not have access to the log entry as stand alone entities, i.e. they have $SE(K_j/H(A_i))$ in approach a) or $AE(K^+_j/(H(A_i),R_j))$ in approach b);
auditors that have access to the log entry only with the collaboration of at least k auditors, i.e. they have $SE(K_j/\Sigma A_i)$ in approach a) or $AE(K^+_j/\Sigma A_i,R_j)$ in approach b), where $\Sigma A_i$ is the share of a random key $A_i$ that allows reconstruction of the random key $A_i$ with the collaboration of other k-1 auditors. Auditors may belong to many groups, thus having many shares of the secret (obviously, the various shares will be related to different polynomials).

Note that the previously listed three sets of auditors may be not disjoint (the first two are disjoint). Thus, the invention allows for auditors that may access a log entry by themselves, or in collaboration with other auditors also, or only when other auditors in the group agree on disclosing the content of a log entry.

To add an auditor to a group, it is sufficient to give the auditor a new share based on the polynomial, encrypting this share with the auditor's key. To exclude an auditor from a group it is sufficient not to give the auditor his share anymore.

To modify the minimum number of auditors necessary to decrypt a log entry, a different polynomial is used, as thought in the above-mentioned *How to share a secret*.

To work properly and to be able to decrypt correctly a log entry for a group, at least the following information for each group are required:
a group identifier (ID group);
the minimum number of auditors necessary to disclose the secret;
the identifiers of all the auditors belonging to the group.

For each auditor that potentially has access to a log entry the following data are stored:
approach a):

$$SE(K_j/[H(A_i), ID_{group'}, \Sigma'A_i, ID_{group''}, \Sigma''A_i, \ldots])$$

approach b):

$$AE(K^+_j/[H(A_i), R_j, ID_{group'}, \Sigma'A_i, ID_{group''}, \Sigma''A_i, \ldots ]R_j)$$

In this example the j-th auditor has not access to the log entry as individual, but only as belonging to some groups. If an auditor does not belong to a group (or a group does not have access to the log entry) then $\Sigma$ may be left as a set of zeroes.

Note that it is not necessary to encrypt fake shares for the non-authorized auditors to preserve elusion property because unpredictability of the encrypted data is already provided by encryption of $A_i$ or $H(A_i)$.

Group auditing applied to multiple groups does not jeopardize the discussed security policies, in particular even if shares of different groups on the random key $A_i$ are joined together, this does not allow the determination of the random key $A_i$.

To demonstrate this, let's suppose the worst case, i.e. let's imagine the case in which m'-1 auditors of a group (requiring m' auditors to compute $A_i$) colluding with m"-1 auditors of another group (requiring m" auditors to compute $A_i$), the two groups may overlap or not.

The two polynomials that it is necessary to determine are:

$$y = \alpha_{m'-1}x^{m'-1} + \alpha_{m'-2}x^{m'-2} + \ldots + \alpha_1 x + A_i$$

$$y = \beta_{m''-1}x^{m''-1} + \beta_{m''-2}x^{m''-2} + \ldots + \beta_1 x + A_i$$

The target is to determine $\alpha$ and $\beta$ values and $A_i$, i.e., m'+m"-1 values in all. The colluding auditors have m'+m"-2 points (possibly not distinct), m'-1 from one polynomial, and m"-1 from the other polynomial. This allows to write a system of m'+m"-2 equations with m'+m"-1 variables. The target may not be reached because the system of equations is undetermined if the assumption is made that a single polynomial of degree m is undetermined if only m-1 points are available. However, to discover the shared key, it is sufficient to determine $A_i$, but this is not possible. Let's denote with P the set of equations coming from the first polynomial and with Q the set of equations coming from the second polynomial.

Given that $A_i$ cannot be determined from P (see the above-mentioned *How to share a secret*), then reduction of this set leads to an equation of this kind:

$$c_1 \alpha_j + c_2 A_i = b_1$$

For the same reason, reduction of Q leads to:

$$c_3 \beta_k + c_4 A_i = b_2$$

where the $c_m$ and $b_n$ are constant values.

The system of these two equations does not allow to determine $A_i$ because $a_j$ and $b_k$ are different unknowns (they are coefficients from different polynomials). Therefore, even if different auditors from different groups collude to determine the shared key, they will not be able to get it unless the required number of auditors in one of the groups is reached.

The same demonstration applies to the case where two auditors belonging to different groups own the same share (i.e. the same point in the plane, where two distinct polynomials intersect).

In addition, to the previously discussed "group auditing", the so-called "category auditing" may also be provided, to meet a need that may arise in some contexts in which one or more auditors belonging to a given category can co-operate with one or more auditors belonging to a different category or different categories.

This need may be met by applying the previously discussed secret sharing algorithm to m categories, thus generating m sub-secrets, and then by applying again the secret sharing algorithm to the m sub-secrets, imposing at the same time that k elements over n in each category are necessary to reconstruct the respective sub-secret, where k is lower than or equal to n and that k and n may change for each category.

Finally, various modifications to the embodiments will be readily apparent to those skilled in the art, and the generic principles herein may be applied to other embodiments and applications without departing from the spirit and scope of the present invention, as defined by the appended claims.

For example, instead of generating a fake key for a log entry having the same properties as the random key $A_i$ in terms of length, uniqueness and randomness, and then encrypting it by using the non-authorized auditors' secret or public keys, elusion property may also be preserved by directly generating a fake key for the log entry having the same properties as the encrypted random key $E(K/A_i)$ in terms of length, uniqueness and randomness. Such a fake key may for example be generated by computing a hash on the encrypted random key $E(K/A_i)$.

Furthermore, instead of encrypting a fake key for a log entry by using the non-authorized auditors' keys, the fake key may also be encrypted by using randomly generated keys different for each non-authorized auditor.

In addition, the preceding description discloses the present invention in relation to sensitive information represented by random keys $A_i$ used to encrypt data sections in the log entries. It may be appreciated that the present invention may also be applied to sensitive information represented directly by data sections in the log entries.

This embodiment differs from the one previously discussed only in the item of sensitive information subjected to encryption: in the first embodiment this item of sensitive information is q random key $A_i$, whereas in this second embodiment this item of sensitive information is data section in a log entry. Therefore, for each auditor that is authorized to access a log entry, in approach a) data section $D_i$ is encrypted by using the auditor's secret key $K_j$, whereas in approach b) data section $D_i$ is encrypted along with a random value $R_r$ different for each authorized auditor by using the auditor's public key $K^+_j$. Instead, for each auditor that is not authorized to access the log entry, in approach a) a fake data section generated by computing a hash on the data section $D_i$ or randomly generated is encrypted by using the auditor's secret key $K_j$, whereas in approach b) a fake data section generated by computing a hash on the data section $D_i$ or randomly generated is encrypted along with a random value $R_r$ different for each non-authorized auditor by using the auditor's public key $K^+_j$.

Group and category auditing may also be applied to this embodiment by distributing shares $\Sigma D_i$ of the data section $D_i$ among the various categories and the auditors in the categories.

In general, for each item of sensitive information to be protected (e.g., for each random key $A_i$ or for each data section $D_i$) an item of fake information may be generated so that it is not possible or practicable for an expert to envisage a test for distinguishing the item of fake information from the item of sensitive information, i.e., for understanding which one is the item of sensitive information and which one is the item of fake information.

For example, the above criteria of having the same properties in terms of length may imply that the same length is adopted for the item of fake information as for the item of sensitive information to be protected. Another possibility is that different lengths are adopted for different items of sensitive information (e.g., within a predetermined range of lengths) so that it will not be possible to distinguish between items of fake and sensitive information based on the length of the item of sensitive information.

As to the uniqueness of an item of fake information, this is to be intended in a statistical sense, i.e., each item of fake information should be generated so that it is highly likely that it is different from another item of fake information (and from the item of sensitive information to be protected), although a coincidence of items of fake information, although highly unlikely, remains possible.

A criterion for establishing randomness of an item of fake information with respect to an item of sensitive information to be protected is, for example, that the item of fake information is generated by a true hardware-based random number generator or by a pseudorandom generator passing FIPS 140-2 test suite.

The invention claimed is:

1. A method for protecting sensitive information for later audit by a plurality of auditors, said sensitive information comprising items of sensitive information, comprising:
   for each auditor of said plurality authorized to access a specific item of sensitive information, encrypting, using a computer at least said specific item of sensitive information by using an auditor's cryptographic key, and
   for each auditor of said plurality not authorized to access said specific item of sensitive information, generating, using a computer a first item of fake information having the same properties as the encrypted specific item of sensitive information,
   wherein said first item of fake information is different for each auditor of said plurality not authorized to access said specific item of sensitive information.

2. A method as claimed in claim 1, wherein said first item of fake information is randomly generated.

3. The method as claimed in claim 1, wherein generating a first item of fake information comprises:
   for each auditor of said plurality not authorized to access said specific item of sensitive information, generating a second item of fake information having the same properties as said specific item of sensitive information, and encrypting said second item of fake information by using a first sensitive cryptographic key.

4. The method as claimed in claim 3, wherein said second item of fake information is different for each auditor of said plurality not authorized to access said specific item of sensitive information.

5. The method as claimed in claim 3, wherein said second item of fake information is randomly generated.

6. The method as claimed in claim 3, wherein said first sensitive cryptographic key is different for each auditor of said plurality not authorized to access said specific item of sensitive information.

7. The method as claimed in claim 3, wherein said first sensitive cryptographic key is randomly generated.

8. The method as claimed in claim 3, wherein said first sensitive cryptographic key is an auditor's cryptographic key.

9. The method as claimed in claim 1, wherein each auditor of said plurality has its own symmetric secret cryptographic key and said auditor's cryptographic key is said secret cryptographic key.

10. The method as claimed in claim 1, wherein each auditor of said plurality has its own pair of asymmetric public and private cryptographic keys and said auditor's cryptographic key is said public cryptographic key.

11. The method as claimed in claim 1, for a log file comprising at least one log entry with a data section, further comprising:
   encrypting said data section by using a second sensitive cryptographic key,
   wherein said specific item of sensitive information is said second sensitive cryptographic key or data allowing reconstruction of said second sensitive cryptographic key when combined with data from other auditors of said plurality authorized to access said second sensitive cryptographic key.

12. The method as claimed in claim 11, wherein said second sensitive cryptographic key is different for each log entry.

13. The method as claimed in claim 11, wherein said second sensitive cryptographic key is randomly generated.

14. The method as claimed in claim 11, wherein said first item of fake information is a first fake cryptographic key having the same properties as the encrypted second sensitive cryptographic key or as the encrypted data allowing reconstruction of said second sensitive cryptographic key.

15. The method as claimed in claim 11, wherein said second item of fake information is a second fake cryptographic key having the same properties as the second sensitive cryptographic key or as the data allowing reconstruction of said second sensitive cryptographic key.

16. The method as claimed in claim 15, wherein said second fake cryptographic key is generated from said second sensitive cryptographic key.

17. The method as claimed in claim 16, wherein said second fake cryptographic key is generated by computing a hash on said second sensitive cryptographic key.

18. The method as claimed in claim 11, further comprising: generating a verification chain entry for each log entry.

19. The method as claimed in claim 18, wherein said verification chain entry is a hash chain entry.

20. The method as claimed in claim 18, wherein generating a verification chain entry for a log entry comprises:
computing the verification chain entry based on a verification chain entry for a preceding log entry on the encrypted data section, on the encrypted second sensitive cryptographic key for each auditor of said plurality authorized to access said specific item of sensitive information or on the encrypted data for each auditor of said plurality authorized to access said specific item of sensitive information allowing reconstruction of each second sensitive cryptographic key, and on the first fake information for each auditor of said plurality not authorized to access said specific item of sensitive information.

21. The method as claimed in claim 18, further comprising: generating a signature entry for each verification chain entry.

22. The method as claimed in claim 19, further comprising: forming an encrypted log entry for each log entry comprising the encrypted data section, the encrypted second sensitive cryptographic key for each auditor of said plurality authorized to access said specific item of sensitive information or the encrypted data for each auditor of said plurality authorized to access said specific item of sensitive information, allowing reconstruction of each second sensitive cryptographic key, the first fake information for each auditor of said plurality not authorized to access said specific item of sensitive information, the verification chain entry and the signature entry.

23. The method as claimed in claim 1, for a log file comprising at least one log entry with a data section, wherein said specific item of sensitive information is said data section or data allowing reconstruction of said data section when combined with data from other auditors of said plurality authorized to access said data section.

24. The method as claimed in claim 23, wherein said first item of fake information is first fake data having the same properties as the encrypted data section or as the encrypted data, allowing reconstruction of said data section.

25. The method as claimed in claim 23, wherein said second item of fake information is second fake data having the same properties as the data section.

26. The method as claimed in claim 25, wherein said second fake data is generated from said data section.

27. The method as claimed in claim 25, wherein said second fake data is generated by computing a hash on said data section.

28. A method as claimed in claim 1, wherein said specific item of sensitive information allows reconstruction of a different item of sensitive information, and further comprising:
distributing said different item of sensitive information among a group of auditors authorized to access said different item of sensitive information; and
reconstructing said different item of sensitive information by combining specific items of sensitive information from at least some of said auditors authorized to access said different item of sensitive information.

29. The method as claimed in claim 1, wherein said specific item of sensitive information allows reconstruction of a different item of sensitive information, and further comprising:
distributing said different item of sensitive information among a group of categories authorized to access said different item of sensitive information, each category being formed by a group of auditors; and
reconstructing said different item of sensitive information by combining specific items of sensitive information from at least some of said auditors authorized to access said different item of sensitive information in a least some of categories authorized to access said different item of sensitive information.

30. The method as claimed in claim 1, wherein said same properties are determined in terms of length, uniqueness, and randomness.

31. The method as claimed in claim 1, wherein said specific item of sensitive information is encrypted along with a random number different for each auditor of said plurality authorized to access said specific item of sensitive information.

32. A processing system programmed to implement the method according to claim 1, comprising:
a central processing unit (CPU);
a module for encrypting at least said specific item of sensitive information by using an auditor's cryptographic key; and
a module for generating a first item of fake information having the same properties as the encrypted specific item of sensitive information.

33. A network of processing systems programmed to implement the method according to claim 1, each of the processing systems in the network comprising
at least one central processing unit (CPU);
at least one module for encrypting at least said specific item of sensitive information by using an auditor's cryptographic key; and
at least one module for generating a first item of fake information having the same properties as the encrypted specific item of sensitive information
wherein, at least one of said processing systems includes a non-transitory computer-readable storage medium for storing information relating to access to a plurality of entities, and wherein said module for encrypting information includes information from the at least one log file relating to access to at least one of said plurality of entities.

34. A non-transitory computer readable storage medium encoded with a computer program product loadable in a processing system, the computer program product comprising computer program code for implementing the method according to claim 1.

* * * * *

UNITED STATES PATENT AND TRADEMARK OFFICE
CERTIFICATE OF CORRECTION

| | | |
|---|---|---|
| PATENT NO. | : 7,770,032 B2 | |
| APPLICATION NO. | : 11/547711 | |
| DATED | : August 3, 2010 | |
| INVENTOR(S) | : Nesta et al. | |

It is certified that error appears in the above-identified patent and that said Letters Patent is hereby corrected as shown below:

\*   Claim 1, column 12, line 7, "computer at least" should read --computer, at least--.

\*   Claim 1, column 12, line 11, "computer a first" should read --computer, a first--.

\*   Claim 29, column 14, line 21, "a least" should read --at least--.

\*   Claim 33, column 14, line 43, "comprising" should read --comprising:--.

Signed and Sealed this
Fourteenth Day of June, 2011

David J. Kappos
*Director of the United States Patent and Trademark Office*